(12) United States Patent
Goker et al.

(10) Patent No.: US 11,688,426 B2
(45) Date of Patent: Jun. 27, 2023

(54) PARTITIONED DATA-BASED TDS COMPENSATION USING JOINT TEMPORARY ENCODING AND ENVIRONMENTAL CONTROLS

(71) Applicant: QUANTUM CORPORATION, San Jose, CA (US)

(72) Inventors: Turguy Goker, Vista, CA (US); James P. Peng, Santa Maria, CA (US); Hoa Le, Orange, CA (US); Suayb Arslan, Sariyer/Istanbul (TR)

(73) Assignee: QUANTUM CORPORATION, San Jose, CA (US)

( * ) Notice: Subject to any disclaimer, the term of this patent is extended or adjusted under 35 U.S.C. 154(b) by 0 days.

(21) Appl. No.: 17/839,480

(22) Filed: Jun. 14, 2022

(65) Prior Publication Data
US 2022/0415357 A1 Dec. 29, 2022

Related U.S. Application Data

(60) Provisional application No. 63/216,197, filed on Jun. 29, 2021.

(51) Int. Cl.
*G11B 20/18* (2006.01)
*G11B 5/55* (2006.01)
*G11B 5/024* (2006.01)

(52) U.S. Cl.
CPC .......... *G11B 20/1886* (2013.01); *G11B 5/024* (2013.01); *G11B 5/5565* (2013.01); *G11B 2020/1869* (2013.01)

(58) Field of Classification Search
None
See application file for complete search history.

(56) References Cited

U.S. PATENT DOCUMENTS

| 10,741,200 | B1* | 8/2020 | Winarski | G11B 5/00813 |
| 2002/0074451 | A1* | 6/2002 | Scholtysik | G11B 23/044 |
| | | | | 242/613.5 |
| 2006/0274828 | A1* | 12/2006 | Siemens | H04N 21/2743 |
| | | | | 348/148 |
| 2013/0148227 | A1* | 6/2013 | Tofano | G06F 3/0682 |
| 2014/0379980 | A1* | 12/2014 | Hasegawa | G06F 3/065 |
| | | | | 711/111 |
| 2016/0259573 | A1* | 9/2016 | Brettell | G06F 3/065 |
| 2018/0196607 | A1* | 7/2018 | Hasegawa | G06F 7/36 |
| 2020/0065022 | A1* | 2/2020 | Itagaki | G06F 16/13 |
| 2022/0415357 | A1* | 12/2022 | Goker | G11B 5/024 |

* cited by examiner

*Primary Examiner* — Peter Vincent Agustin
(74) *Attorney, Agent, or Firm* — Roeder & Broder LLP; James P. Broder

(57) ABSTRACT

A method for providing enhanced readability of data written to a magnetic tape, includes the steps of (i) writing data to a first tape partition using a tape drive, the data being written under a first dimensional stability condition; (ii) monitoring an ambient dimensional stability condition with a condition monitor to determine if the ambient dimensional stability condition has moved at least a predetermined threshold value from the first dimensional stability condition toward a preferred dimensional stability condition; and (iii) replicating the data to a second tape partition with a data replicator when it has been determined that the ambient dimensional stability condition has moved at least the predetermined threshold value from the first dimensional stability condition toward the preferred dimensional stability condition.

20 Claims, 7 Drawing Sheets

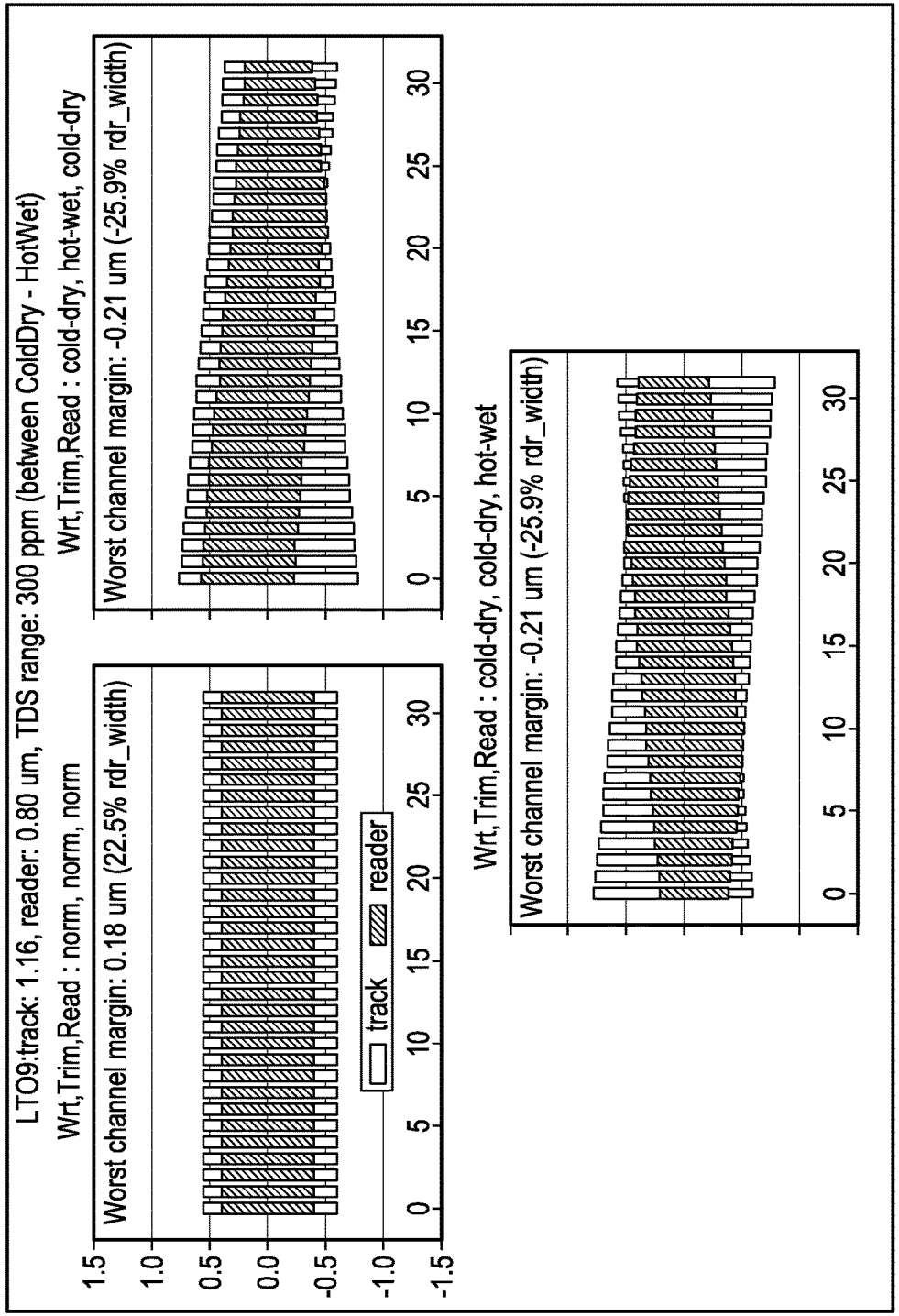
FIG. 1 (Prior Art) Continued
Middle column are the worst trim cases that could cause over-trim written tracks, smart servo scheme can mitigate the situation. Right column charts are the worst read cases that could require significant higher C1/c2 error and ERP to recover the data.

PARTITIONED DATA-BASED TDS COMPENSATION USING JOINT TEMPORARY ENCODING AND ENVIRONMENTAL CONTROLS

RELATED APPLICATION

This application claims priority on U.S. Provisional Application Ser. No. 63/216,197, filed on Jun. 29, 2021, and entitled "PARTITIONED DATA-BASED TDS COMPENSATION USING JOINT TEMPORARY ENCODING AND ENVIRONMENTAL CONTROLS". As far as permitted, the contents of U.S. Provisional Application Ser. No. 63/216,197 are incorporated in their entirety herein by reference.

BACKGROUND

Automated tape library systems (or "tape libraries") are commonly utilized for purposes of writing data to and reading data from magnetic tape cartridges. Magnetic tape cartridges are configured to retain and/or store magnetic tape that can be used in a magnetic tape drive for purposes of reading data from and writing data to the magnetic tape. Magnetic tape cartridges have been used extensively because they provide a convenient way to house and support a length of magnetic tape for engagement by a transducer (or tape head, sometimes referred to simply as a "head") in the tape drive while protecting the tape upon removal of the cartridge. Moreover, magnetic tape cartridges facilitate economic and compact storage of data. During use of the magnetic tape drive, a tape head of the magnetic tape drive is configured to be in direct contact with the magnetic tape from the magnetic tape cartridge so that data can be written to and read from the magnetic tape as the magnetic tape moves across the tape head at varying speed from low speed to high speed. Such tape heads can include dedicated write heads, dedicated read heads, or combination read/write heads.

Over the years, storage capacity within individual tape cartridges has increased dramatically, with such storage capacity being typically doubled for each new generation of storage media, such as approximately every two to three years. It is appreciated that tape capacity growth is a function of multiple variables, with the areal density of the tape being a main contributor to the tape capacity growth. Areal density is defined by the size and shape of the written bit, which is typically rectangular-shaped. More particularly, the areal density can be defined as a product of the bit length (or linear density of the recording) and the bit width (or track pitch). The size and shape of the written bit can also be described in terms of the Bit Aspect Ratio (BAR), which is the ratio of the track pitch to the bit length. It is further appreciated that the selection of track pitch and bit length (or linear density) is done based on tracking, dimensional stability, and magnetic recording, which is dominated by head and media interface and design.

In the past, the management of transverse dimensional stability (TDS) issues was done by tolerance control. Each component had limits on how much variation from design parameters was allowed. As track density and/or areal density increased, the allowable limits for variation were also decreased. However, to continue to increase track density and/or areal density to support high tape cartridge capacities, this method is no longer feasible, as components cannot be made at lower variation. Additionally, for any change of the variation factor, the corresponding TDS response is viscoelastic, with a long time required to reach equilibrium. Consequentially, methods to minimize TDS, such as tension-controlled shuttling after/before each cartridge load/unload, start to become an unbearable burden to the tape library functionality.

Accordingly, the capacity growth of future tape storage schemes will be limited if new techniques for managing head and media dimensional stability are not developed. To limit the TDS effect, many novel ideas have been proposed, but they are mainly for future tape storage systems with concepts that are drastically different from the current tape system design, and they typically require 5-10 years to test and refine. None are available for today's newest tape systems, where TDS has already noticeably affected the quality and reliability.

It is appreciated that the lateral dimension of a tape can change due to humidity as well as other conditions such as temperature, aging and creep. However, humidity is the main contributor to such lateral dimensional changes to the tape. As a result, data tracks written in one condition may not be able to be accurately read in another condition if the tape substrate has experienced dimensional changes, and if track pitch and magnetic head dimensions for writers and readers don't have the required margins and tolerances. For instance, FIG. 1 is a prior art graphical representation 100P of potential TDS issues occurring between reader and tape as a result of writing data to and reading data from the tape under different environmental conditions. More specifically, FIG. 1 shows the typical read and write process with different environmental conditions and effects of TDS for LTO-8 and LTO-9 operating points. As illustrated, changes in environmental conditions from the time of initial writing of the data tracks can cause issues with the ability of the tape drive to accurately read the data tracks if they are being read in environmental conditions that are different than when the data tracks were written and/or trimmed. In this Figure, the graphs on the top row relate to the use of LTO-8 tape drives, while the graphs on the bottom row relate to the use of LTO-9 tape drives. In the graphs on the left in each row, the environmental conditions were normal or moderate during write, trim and read functions. As a result, the reader has no issue accurately reading the data tracks that have been written to the tape. However, in the graphs in the middle of each row, the data tracks are written and subsequently read in similar environmental (cold-dry) conditions, but they are trimmed under different environmental (hot-wet) conditions. In such situations, as shown, the result can be written tracks that are over-trimmed due to the lateral expansion of the tape under such environmental conditions. This can result in a decreased ability of the tape drive to accurately read the data tracks that have been written to the tape. Additionally, in the graphs on the right in each row, the data tracks are written and trimmed in similar environmental (cold-dry) conditions, but they are being read in different environmental (hot-wet) conditions. In such situations, these are the worst read cases which could require significantly higher C1/C2 error and ERP to recover the data.

It is appreciated that if a tape drive writes to tape under hot and wet environmental conditions, the tape will expand laterally resulting in data tracks being written under tape stretch conditions. For the same tape when read at nominal conditions, the same data tracks originally written in stretch mode will come closer with nominal conditions (lower humidity mainly) and top and bottom readers and tracks will start misaligning, but data can still be read due to C2 Error Correction Code (ECC) decoding, which can protect up to a 4-channel loss with a 32-channel format. However, as conditions start to get cold and dry, the same data tracks will shrink even more, resulting in more readers on top and bottom being misaligned with the data tracks, which will eventually result in failure of C2 ECC decoding, resulting in hard read error. Recording like this can only be recovered when the environmental conditions change to enable top and bottom readers to start realigning again.

Therefore, current systems with high track (or areal) densities and substrates having high sensitivity to environmental conditions require tighter environmental conditions which increases overall cost of the archival storage including Active Archive applications.

Current LTO-9 operating point requires narrower tracks to increase areal densities, while using the same tape substrates with similar TDS characteristics as previous generations where wider tracks were used. This resulted in narrowing the operational environmental range which has historically been 20% to 80% relative humidity (RH) for LTO tape down to 20% to less than 50%. This new requirement basically will have a negative impact on how the tapes are used in low and mid-size markets where tighter environmental controls may not be an option.

SUMMARY

The present invention is directed toward a method for providing enhanced readability of data written to a magnetic tape, the method including the steps of (i) writing data to a first tape partition using a tape drive, the data being written under a first dimensional stability condition; (ii) monitoring an ambient dimensional stability condition with a condition monitor to determine if the ambient dimensional stability condition has moved at least a predetermined threshold value from the first dimensional stability condition toward a preferred dimensional stability condition; and (iii) replicating the data to a second tape partition with a data replicator when it has been determined that the ambient dimensional stability condition has moved at least the predetermined threshold value from the first dimensional stability condition toward the preferred dimensional stability condition.

In some embodiments, the predetermined threshold value can entail movement of at least approximately 50% toward the preferred dimensional stability condition.

In certain embodiments, the predetermined threshold value is determined at least in part based on one or more of track densities for a given capacity format, substrate specification, and transverse dimensional stability of the magnetic tape.

In some embodiments, the first dimensional stability condition can include relative humidity; and the preferred dimensional stability condition can be between approximately 40% and 50% relative humidity.

In certain embodiments, the predetermined threshold value can entail movement of at least approximately 15% relative humidity toward the preferred dimensional stability condition.

In some embodiments, the first dimensional stability condition can include one of temperature, aging, and creep.

In certain embodiments, the first dimensional stability condition includes a physical tape dimension of the magnetic tape. In some embodiments, the step of monitoring includes monitoring the physical tape dimension by measuring tape servo format information.

In various embodiments, the method can also include the step of deleting the data written to the first tape partition after the data has been replicated to the second tape partition.

In some embodiments, the first tape partition and the second tape partition can be separate partitions of a common magnetic tape.

In certain embodiments, the first tape partition can be provided within a first magnetic tape and the second tape partition can be provided within a second magnetic tape that is different than the first magnetic tape.

In some embodiments, the step of monitoring can include monitoring the ambient dimensional stability condition with one of a host application that is configured to provide instructions to the tape drive, and a drive controller of the tape drive.

In some embodiments, the magnetic tape can include a tape substrate including one of polyethylene naphthalate and polyethylene terephthalate.

In various embodiments, the method can also include one of (i) recording metadata related to the first dimensional stability condition on the magnetic tape; and (ii) recording metadata related to the first dimensional stability condition onto a cartridge memory of a tape cartridge that retains the first tape partition.

The present invention is also directed toward a system for providing enhanced readability of data written to a magnetic tape, including a tape drive; a first tape partition, wherein data is written to the first tape partition using the tape drive, the data being written to the first tape partition under a first dimensional stability condition; a second tape partition; a condition monitor that monitors an ambient dimensional stability condition to determine if the ambient dimensional stability condition has moved at least a predetermined threshold value from the first dimensional stability condition toward a preferred dimensional stability condition; and a data replicator that replicates the data to the second tape partition when it has been determined that the ambient dimensional stability condition has moved at least the predetermined threshold value from the first dimensional stability condition toward the preferred dimensional stability condition.

The present invention is further directed toward a method for providing enhanced readability of data written to a magnetic tape, the magnetic tape including a tape substrate including one of polyethylene naphthalate and polyethylene terephthalate, the method including the steps of writing data to a first tape partition using a tape drive, the data being written under a first dimensional stability condition; monitoring an ambient dimensional stability condition with a condition monitor to determine if the ambient dimensional stability condition has moved at least a predetermined threshold value from the first dimensional stability condition toward a preferred dimensional stability condition, the predetermined threshold value entailing movement of at least approximately 50% toward the preferred dimensional stability condition, monitoring including monitoring the ambient dimensional stability condition with one of a host application that is configured to provide instructions to the tape drive, and a drive controller of the tape drive; replicating the data to a second tape partition with a data replicator when it has been determined that the ambient dimensional stability condition has moved at least the predetermined threshold value from the first dimensional stability condition toward the preferred dimensional stability condition; and deleting the data written to the first tape partition after the data has been replicated to the second tape partition; wherein the first dimensional stability condition includes one of relative humidity, temperature, aging, creep, and a physical tape dimension of the magnetic tape; and wherein the predetermined threshold value is determined at least in part based on one or more of track densities for a given capacity format, substrate specification, and transverse dimensional stability of the magnetic tape.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
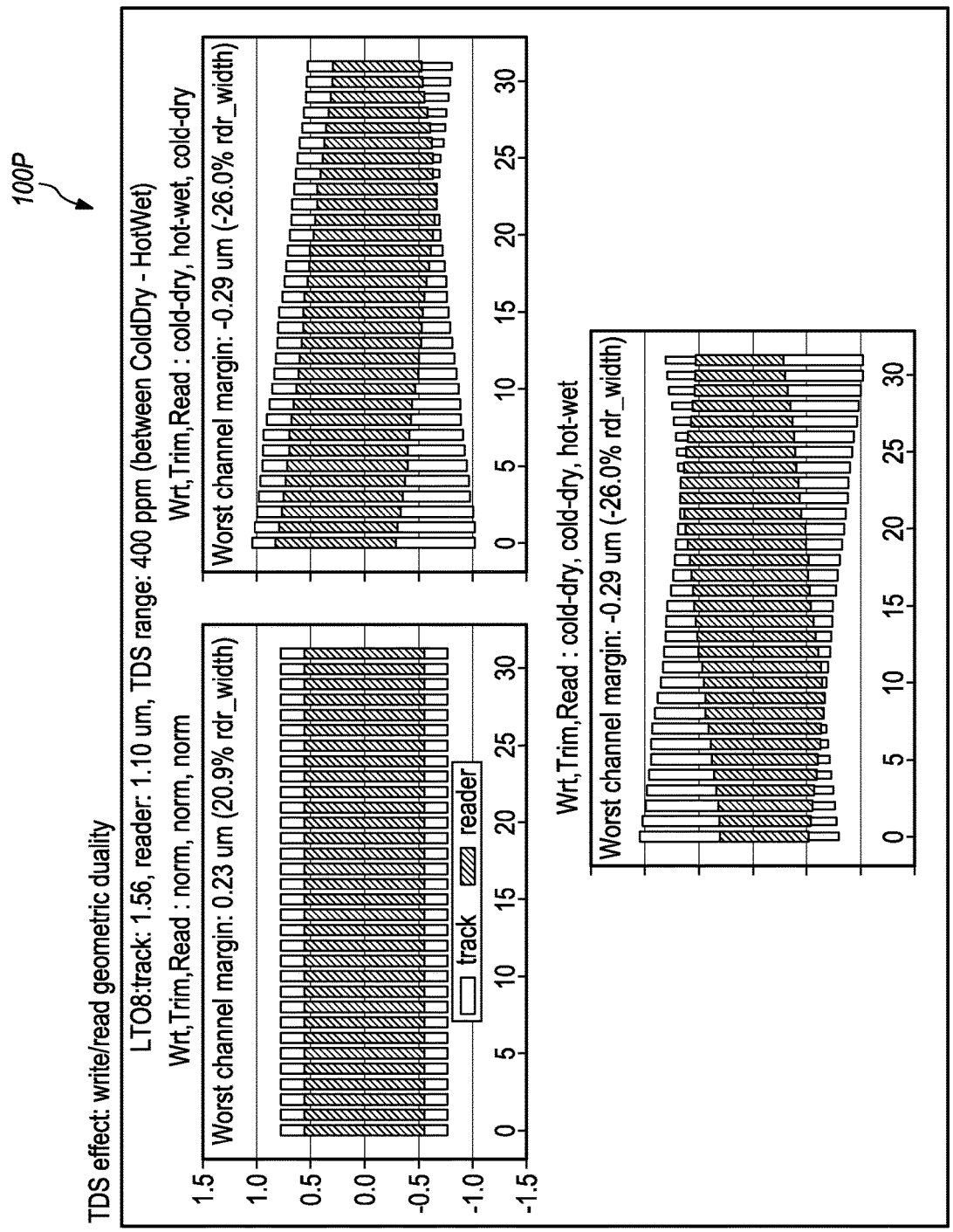
FIG. 1 is a prior art graphical representation of potential TDS issues occurring between reader and tape due to writing data to and reading data from the tape under different environmental conditions.

Embodiments of the present invention are described in the context of a partitioned data-based TDS compensation system and method using joint temporary encoding and environmental controls. More particularly, in such systems and methods, tape partitions of magnetic tapes are used to replicate data temporarily while managing access capacity adaptively therefore enabling the system to operate over typical wide environmental ranges with the reliability of narrower and higher cost archival range.

In various embodiments, environmental conditions for the tape drive and the tape cartridge, such as humidity, temperature, aging and creep, with humidity being the primary focus, are monitored via a condition monitor, such as tape drive firmware, hardware or software incorporated within a drive controller and/or host software, hardware or firmware incorporated within a host application, in certain applications. When data is written to data tracks on a magnetic tape in environmental conditions that are less than ideal (such as the environmental conditions being too hot and wet, or environmental conditions being too cold and dry), and it is determined via the drive controller and/or the host application that the current environmental conditions have moved at least a certain threshold value toward more ideal environmental conditions (such as more moderate humidity and temperature), the system includes a data replicator that is configured to replicate or copy the data onto a different tape partition of the same tape or onto a different tape. In such more ideal environmental conditions, the tape drive is better able to read the written data under the different, improved current environmental conditions. Subsequently, the previously written data tracks that were written in less ideal environmental conditions can be deleted, thereby recovering their location on the tape for new data. Thus, the system operates with no loss of overall data capacity.

It is appreciated that in embodiments where a single tape includes multiple tape partitions, the tape partitions can be written to independently without impacting the data that is written to any of the other tape partitions on that tape. In embodiments where the different tape partition to which the data is replicated or copied is included within a different tape, it is further appreciated that each individual tape can be formed as a single tape partition, such that the entire tape can be referred to as a tape partition.

More specifically, in certain aspects of the present invention, the tape drive and tape cartridge conditions can be monitored by the condition monitor, such as the host software and/or the tape drive firmware in certain non-exclusive applications, which typically manage user data processing and tape drive tasks such as writing or reading such that only the critical data that may not be read if environmental conditions change is duplicated at an optimum environmental condition. Therefore, the tape drive and tape media can be used over the full environmental range, unlike in current systems. For example, with the narrower track and/or areal densities of current LTO-9 systems, it has been determined that when data tracks are written (or rewritten) in relative humidity conditions of between approximately 40% and 50% relative humidity through application of the present invention, the tape drive can then accurately read the data tracks even when the current relative humidity conditions have changed to be anywhere over a broad range of from 20% to 80% relative humidity.

It is appreciated that the system and method described herein can be further configured to incorporate a data replicator that can replicate or copy such data when deemed appropriate based on dimensional stability conditions other than relative humidity, such as temperature, aging and creep. It is further appreciated that various dimensional stability conditions referred to herein can also be referred to as environmental conditions. Thus, in some instances, the terms "dimensional stability conditions" and "environmental conditions" can be used somewhat interchangeably. As referred to herein, "ambient dimensional stability conditions" can refer to such environmental conditions as noted above, but can also refer to physical tape dimensions that may be impacted by changes in such environmental conditions. As such, when the system and method is described to include a step of monitoring an ambient dimensional stability condition, such step may include monitoring environmental conditions, and/or may also include physical tape dimensions which can be monitored by measuring tape servo format information for transverse direction of tape at different longitudinal positions along the tape so both environmental as well as servo format for tape physical dimensions.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementations, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 2:
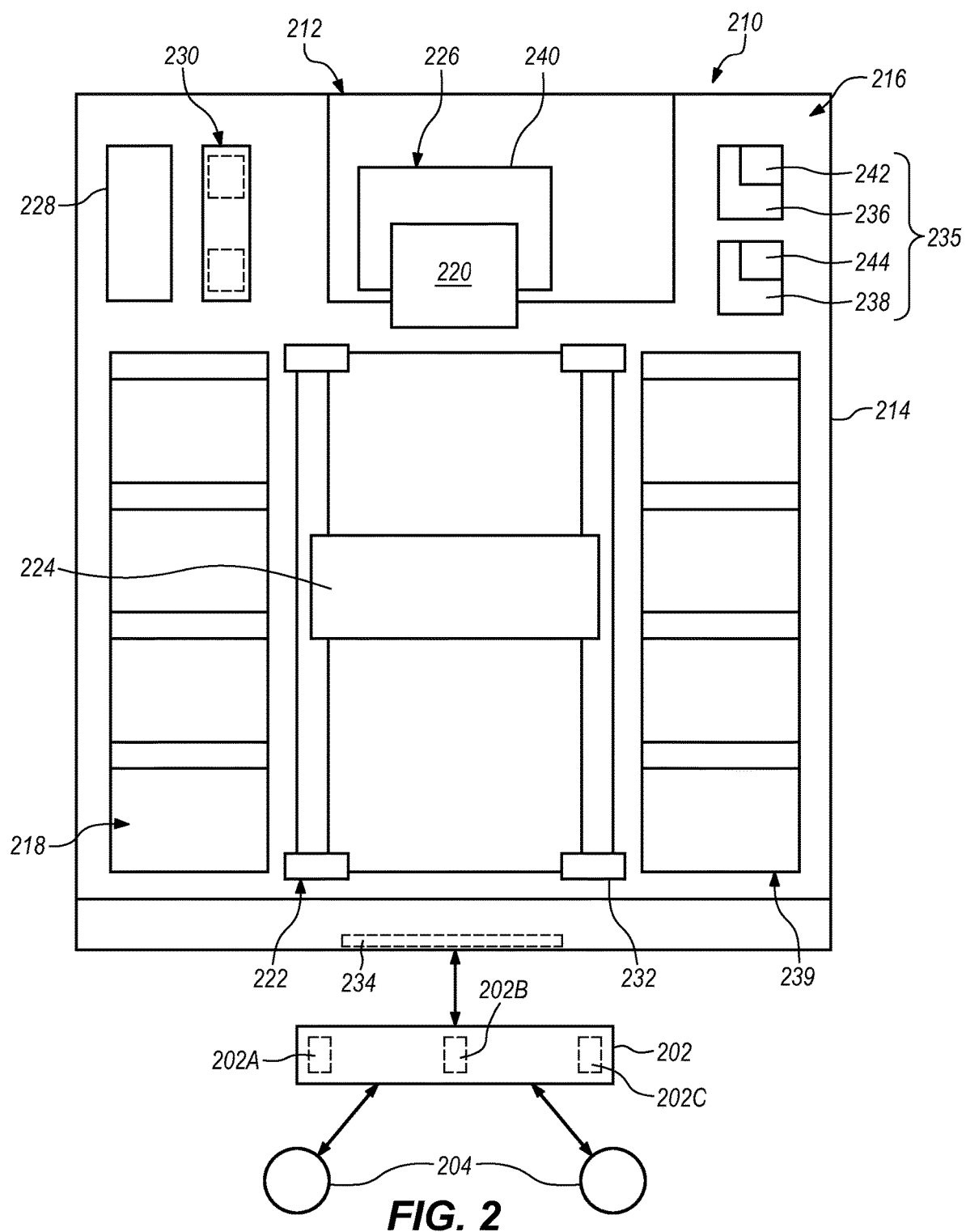
FIG. 2 is a simplified schematic top view illustration of an embodiment of an automated tape library system having features of the present invention.

FIG. 2 is a simplified schematic top view illustration of one or more hosts 202 (only one is illustrated in FIG. 2), one or more users 204 (two are illustrated in FIG. 2), and an automated tape library system 210 (also sometimes referred to simply as a "tape library") having features of the present invention. The tape library 210 includes a tape drive system 212 that includes one or more tape drives 226 that are usable for writing data to and reading data from magnetic tape 350 (illustrated in FIG. 3) that is retained within a tape cartridge 220. In FIG. 2, a top cover (not shown) has been omitted for clarity so that the interior of the tape library 210 is visible.

As illustrated, the one or more hosts 202 provide a means of access to the tape library 210 for the one or more users 204. Moreover, during operation, the one or more users 204 can issue requests or instructions to the tape library 210 that are forwarded via the one or more hosts 202. The one or more hosts 202 can include host firmware 202A (illustrated as a box in phantom), host hardware 202B (illustrated as a box in phantom) and host software 202C (illustrated as a box in phantom) for purposes of forwarding user requests to the tape library 210 and/or for performing any other functions of the one or more hosts 202. For example, in certain embodiments, the host software 202C (and/or the host firmware 202A or host hardware 202B) can be utilized as the condition monitor for purposes of monitoring the dimensional stability conditions and/or environmental conditions for the tape library 210, the tape drives 226 and/or the tape cartridges 220 usable within the tape drives 226. Thus, with such design, data tracks can be replicated or copied onto different partitions of magnetic tape 350 within the tape cartridge 220 under the most preferred or ideal such conditions to most effectively ensure accurate reading of such data tracks in any such conditions (ideal or non-ideal).

It is appreciated that the dimensional stability conditions and/or environmental conditions under which the magnetic tape 350 is being used can have different impacts on the lateral dimensions of the magnetic tape 350 depending on the particular materials used as a tape substrate for the magnetic tape 350. In certain embodiments, materials such as polyethylene naphthalate (PEN) or polyethylene terephthalate (PET) can be used for the tape substrate. Thus, the present invention can be implemented without the need for more expensive materials such as aramid-type tape substrates. Alternatively, the tape substrate can be formed from other suitable materials.

Although only one host 202 is illustrated in FIG. 2, it is recognized that any number of hosts can be wired and/or wirelessly connected for use with the tape library 210 to provide a means of access to the tape library 210 for the one or more users 204. As shown in the embodiment illustrated in FIG. 2, the tape library 210 can be accessible to two users 204. Alternatively, access to the tape library 210 can be limited to only one user 204 or access to the tape library 210 can be provided to more than two users 204.

The design of the tape library 210 can be varied as desired. In particular, the tape library 210 can have any suitable design that is capable of storing a plurality of tape cartridges 220 and using one or more tape drives 226 to write data to and read data from the plurality of tape cartridges 220. More specifically, it is noted that the tape library 210 illustrated in FIG. 2 is just one non-exclusive example of a tape library 210 usable with the present invention, and no limitations are intended based on the specific type and/or size of the tape library 210 shown in FIG. 2.

In various embodiments, as illustrated in FIG. 2, the tape library 210 can include one or more of: (i) a library housing 214 that defines an library interior 216, (ii) a plurality of storage slots 218 that are each configured to receive and selectively retain (and store) a tape cartridge 220, (iii) a rack assembly 222 including one or more racks 232, (iv) a tape cartridge retrieval assembly 224 (also sometimes referred to as a "retrieval assembly"), (v) the tape drive system 212 including the one or more tape drives 226, (vi) a power supply 228, (vii) a library control system 230, (viii) a graphical user interface 234 (illustrated in phantom, and also sometimes referred to as a "GUI"), and (ix) a climate controller 235. In some embodiments, the climate controller 235 can include one or more temperature controllers 236 (only one temperature controller 236 is illustrated in FIG. 2), and/or one or more humidity controllers 238 (only one humidity controller 238 is illustrated in FIG. 2).

As an overview, in various embodiments, dimensional stability conditions and/or environmental conditions for the tape drive 226 and the tape cartridge 220, such as humidity, temperature, aging and creep, are monitored by the condition monitor in the form of a drive controller 368 (illustrated in FIG. 3) of the tape drive 226 and/or the host application 202. In situations when data is written to data tracks on the magnetic tape 350 in environmental conditions that are less than ideal, the condition monitor such as the drive controller 368 and/or host application 202 can continually monitor the environmental conditions to determine when and if the current environmental conditions have moved within a certain threshold toward more ideal environmental conditions (such as more moderate humidity and temperature). When such determinations are made, then the tape library 210 and/or the tape drive 226 is configured to utilize the data replicator to replicate or copy the data onto a different tape partition of the same magnetic tape 350 or onto a tape partition of a different magnetic tape 350. In such more ideal environmental conditions, the tape drive 226 is then better able to read the written data under the different, improved current environmental conditions. Moreover, with the data now having been written in such more ideal environmental conditions, the tape drive 226 is better able to accurately read such data even in situations where the environmental conditions have again strayed from the ideal. Subsequently, the previously written data tracks that were written in less ideal environmental conditions can be deleted, thereby recovering its location on the magnetic tape 350 for new data. Thus, the system is able to operate with no loss of overall data capacity. The tape partitions within any single magnetic tape 350 can be configured such that data written to any single tape partition does not impact the data written to any other tape partition on that magnetic tape 350.

It is appreciated that the noted threshold value for movement toward more ideal environmental conditions can be varied. For example, in some embodiments, the threshold value for movement toward more ideal environmental conditions can include movement of at least approximately 10%, 20%, 30%, 40%, 50%, 60%, 70%, 80%, 90%, or 100% toward more ideal environmental conditions. It is further appreciated that the thresholds and/or the ideal environmental conditions can be varied depending on typical environmental conditions that exist in the geographical or physical areas in which the tape drive 226 and the tape cartridge 220 are being used.

As referred to herein, it is also appreciated that noted threshold values and/or threshold changes may vary depending upon such factors as track densities for a given capacity format, media substrate specification, and TDS (Transverse Dimensional Stability) characteristics. More particularly, as utilized herein, values for thresholds are determined based on track densities for a given capacity format, media substrate specification and TDS characteristics, which all will establish a set of thresholds. Moreover, these may be different for different generations of tape drives as capacities increase, and also potentially for different substrates that media vendors use for the tape cartridges. For example, it is appreciated that the threshold values will typically change based on capacities (track density change) and tape substrates as thinner media is used that results in thinner substrates and different materials with different TDS characteristics.

In the specific example where humidity is the particular dimensional stability condition and/or environmental condition being evaluated and monitored, the threshold value for movement toward more ideal conditions can be movement of at least approximately 5% relative humidity (RH), 10% RH, 15% RH, 20% RH, 25% RH or 30% RH toward more ideal conditions, which can be 40% to 50% RH, or simply 50% RH.

In some embodiments, the relative humidity can be measured inside the tape library 210 by humidity sensors in the tape library 210 and/or by tape drive-based humidity sensors. However, it is further appreciated that the values for thresholds will also be based on tape servo format measurements defining the transverse dimension of the tape as a function of environmental conditions, such as temperature and humidity.

The library housing 214 is configured to retain various components of the tape library 210. For example, in the embodiment illustrated in FIG. 2, the plurality of storage slots 218, the rack assembly 222 including the one or more racks 232, the retrieval assembly 224, the one or more tape drives 226 of the tape drive system 212, the power supply 228, the library control system 230, and the climate controller 235 can all be received and retained at least substantially, if not entirely, within the library interior 216 that is defined by the library housing 214. As illustrated in FIG. 2, the library housing 214 can be rigid and can have a substantially rectangular-shaped cross-section. Alternatively, the library housing 214 can have another suitable shape or configuration. For example, the library housing 214 can have a substantially square-shaped cross-section or any other suitable shaped cross-section. In certain embodiments, the library housing 214 may be constructed of any number of conventional materials such as, for example, those utilized in industry standard rack mount cabinets.

In the embodiment shown in FIG. 2, the plurality of storage slots 218 can be positioned within the library housing 214, with the storage slots 218 being configured to receive and retain (and store) the tape cartridge(s) 220. More particularly, in various embodiments, each of the storage slots 218 is configured to receive and retain a single tape cartridge 220. It is noted that no tape cartridges 220 are shown as being retained within the storage slots 218 in FIG. 2 for clarity.

The tape library 210 can include any suitable number of storage slots 218, and/or the tape library 210 can be designed to retain any suitable number of tape cartridges 220. Moreover, the storage slots 218 can be arranged within the tape library 210 in any suitable manner. For example, in certain embodiments, the tape library 210 can include forty storage slots 218 arranged in two four-by-five storage areas. More particularly, in this embodiment, the tape library 210 includes two magazines 239, one on each side of the retrieval assembly 224, with each magazine 239 including four columns of storage slots 218, and with each column having five storage slots 218 oriented substantially horizontally one on top of another (with limited spacing therebetween). It is understood that from the simplified top view shown in FIG. 2, the number of storage slots 218 in each column is not readily apparent. Alternatively, the tape library 210 can include greater than forty or fewer than forty storage slots 218 and/or the storage slots 218 can be arranged in a different manner than is illustrated and described in relation to FIG. 2. For example, in certain non-exclusive alternative embodiments, the tape library 210 can be configured to include hundreds or even thousands of storage slots 218, each being configured to receive and retain a separate tape cartridge 220.

The design and configuration of the rack assembly 222 can be varied to suit the specific requirements of the tape library 210. For example, in one non-exclusive embodiment, the rack assembly 222 can include four individual racks 232 that are spaced apart from one another. In some embodiments, each rack 232 can be oriented in a generally vertical direction and can extend a height that is sufficient to enable the retrieval assembly 224 to effectively retrieve a tape cartridge 220 from any of the plurality of storage slots 218. Alternatively, the rack assembly 222 can include a different number of racks 232. For example, in some non-exclusive alternative embodiments, the rack assembly 222 can include two racks 232, three racks 232 or more than four racks 232 that can be spaced apart from one another.

The retrieval assembly 224 selectively, such as upon request of a user 204 or host application 202, retrieves and moves the tape cartridges 220 as desired between the storage slots 218 and the tape drives 226. In particular, during use, upon receiving a signal from the library control system 230 to access a certain tape cartridge 220, the retrieval assembly 224 can be manipulated to physically retrieve the requested tape cartridge 220 from its associated storage slot 218 in the tape library 210. Subsequently, the retrieval assembly 224 moves the tape cartridge 220 to an appropriate tape drive 226 and inserts the tape cartridge 220 into a drive housing 240 of the tape drive 226 so that requested read/write operations can be performed. Upon completion of the requested read/write operations, the retrieval assembly 224 can then return the tape cartridge 220 to an appropriate storage slot 218.

It is appreciated that although a single retrieval assembly 224 is illustrated in FIG. 2, the tape library 210 can be designed to include more than one retrieval assembly 224. For example, in one non-exclusive alternative embodiment, the tape library 210 can include two retrieval assemblies 224 that function in different portions of the tape library 210 and/or that provide redundancy in the event that one of the retrieval assemblies 224 fails.

The one or more tape drives 226 are configured for reading and/or writing data with respect to the tape cartridge 220. The number of tape drives 226 provided within the tape library 210 can be varied to suit the specific requirements of the tape library 210. For example, in certain embodiments, the tape library 210 can include three tape drives 226 that are stacked substantially one on top of another (with limited spacing therebetween). Alternatively, the tape library 210 can include greater than three or fewer than three tape drives 226 and/or the tape drives 226 can be positioned in a different manner relative to one another. For example, in certain non-exclusive alternative embodiments, the tape library 210 can be configured to include one hundred or more tape drives 226.

In certain embodiments, the tape library 210 can include more than a single tape drive system 212 for purposes of providing the one or more tape drives 226. For example, in some embodiments, the tape library 210 can include a plurality of tape drive systems 212, with each tape drive system 212 including one or more individual tape drives 226. In one such embodiment, the tape library 210 can include three individual tape drive systems 212, with each tape drive system 212 including a single tape drive 226, to provide a total of three tape drives 226 for the tape library 210. Alternatively, the tape library 210 can include any desired number of tape drive systems 212 and/or tape drives 226.

The power supply 228 provides electrical power in a well-known manner to the one or more tape drives 226, the retrieval assembly 224, the library control system 230 and/or additional tape libraries 210. The power supply 228 can be interfaced with these components as well as with an external power source in a well-known manner using industry-standard cabling and connections. Alternatively, the power supply 228 can be interfaced with these components in another manner.

The library control system 230 provides the desired and necessary control for oversight functionality of the tape library 210, including at least the operation of the retrieval assembly 224 and the climate controller 235. The library control system 230 can have any suitable design, many of which are well-known in the industry. For example, in one embodiment, the library control system 230 can include a standard driver interface unit for receiving digital commands and translating the commands into driving currents, such as step pulses for controlling stepper motors, and/or for controlling the climate controller 235. In some embodiments, the library control system 230 can include a standard programmable general-purpose computer formed on a single plug-in card unit and can include a programmed microprocessor or microcontroller, memory, communication interface, control interface, connectors, etc. Alternatively, the library control system 230 can have a different design and/or the library control system 230 can be positioned within the tape library 210 in a different position or manner than that illustrated in FIG. 2.

The tape library 210 can use well-known industry-standard cabling and communication protocols between the library control system 230 and other structures of the tape library 210. Cabling and electrical characteristics including signaling protocols can be generally standardized, and the logical message protocols can be either proprietary or standardized as known to those skilled in the art.

As shown, the tape library 210 can also include the GUI 234, such as an interactive touchscreen graphical user interface or another suitable graphical user interface, which allows the user 204 or host 202 to interact with and/or transmit requests or commands to and/or from the tape library 210.

The climate controller 235 controls the climate within the library interior 216. In various embodiments, the climate controller 235 can regulate, adjust, control and/or maintain a specific climate within the library interior 216. In certain embodiments, at various times, the specific climate that is regulated, adjusted, controlled and/or maintained by the climate controller 235 within the library interior 216 can be based on a climate outside of the library interior 216. As noted, in certain embodiments, the climate controller 235 includes the temperature controller 236 and the humidity controller 238.

The temperature controller 236 regulates and/or adjusts the temperature within the library interior 216 of the tape library 210. The design and/or particular type of temperature controller 236 included in the tape library 210 can vary. For example, the temperature controller 236 can include any suitable type of cooling unit that can selectively lower the temperature within the library interior 216; and/or the temperature controller 236 can include any suitable type of heating unit that can selectively increase the temperature within the library interior 216. In various embodiments, the temperature controller 236 can include one or more temperature sensors 242 (only one temperature sensor 242 is illustrated in FIG. 2) that can sense an ambient temperature within or outside of the library interior 216. The temperature sensor(s) 242 can have any suitable design and/or can be positioned in any suitable location(s), such as within and outside of the library interior 216 of the tape library 210. In certain embodiments, the temperature controller 236 can receive data from the temperature sensor 242, and automatically adjust and/or control the temperature within the library interior 216 in accordance with predetermined temperature standards based on such data.

The humidity controller 238 regulates and/or adjusts the humidity within the library interior 216 of the tape library 210. The design and/or particular type of humidity controller 238 included in the tape library 210 can vary. For example, the humidity controller 238 can include any type of humidifier or dehumidifier, or any other suitable type of humidity controller 238 that can selectively change (raise or lower) and/or control the humidity within the library interior 216. In various embodiments, the humidity controller 238 can include one or more humidity sensors 244 (only one humidity sensor 244 is illustrated in FIG. 2) that can sense the humidity within or outside of the library interior 216. The humidity sensor(s) 244 can have any suitable design and/or can be positioned in any suitable location(s), such as within and outside of the library interior 216 of the tape library 210. In certain embodiments, the humidity controller 238 can receive data from the humidity sensor 244, and automatically adjust and/or control the humidity within the library interior 216 in accordance with predetermined humidity standards based on such data.

Figure 3:
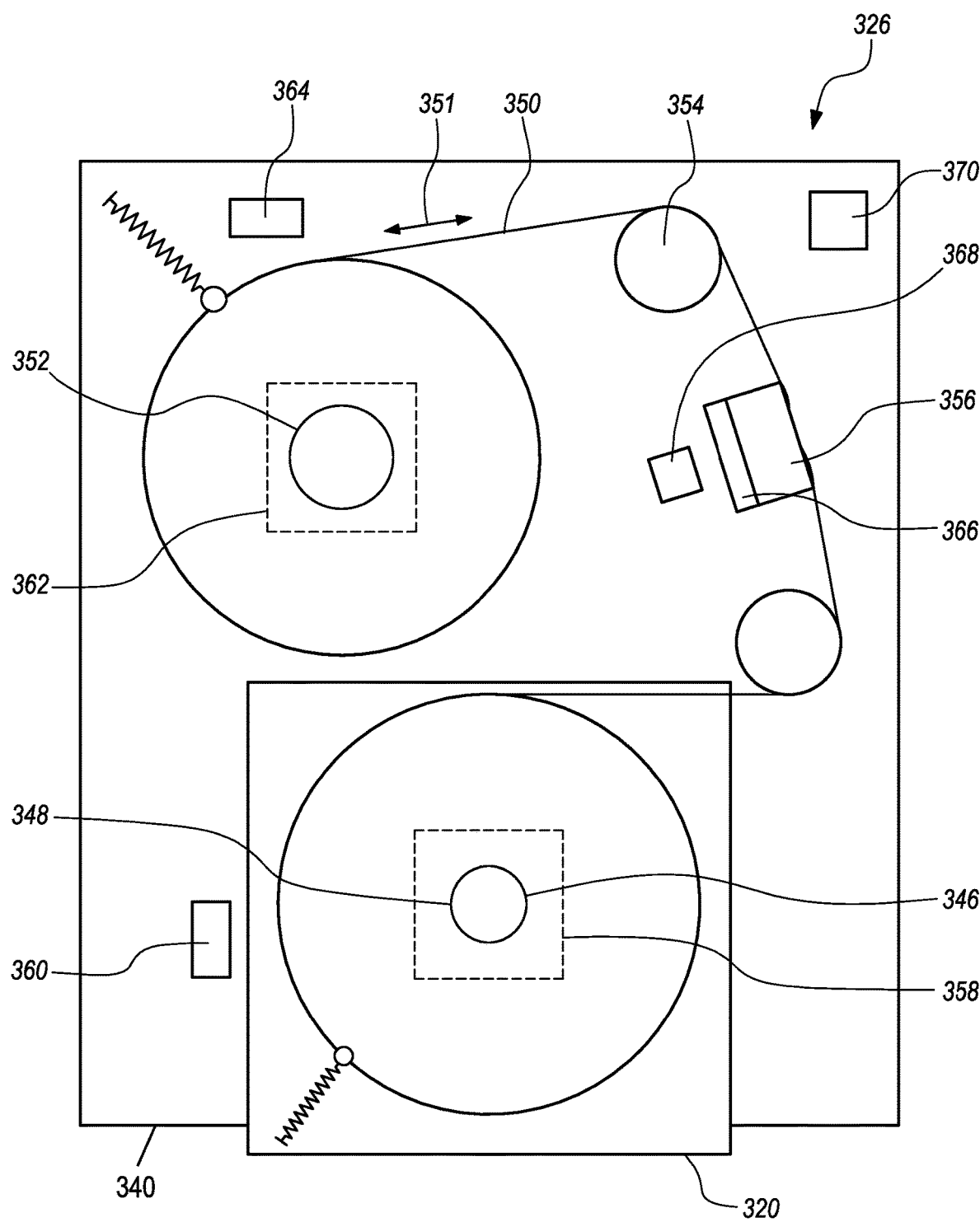
FIG. 3 is a simplified schematic top view illustration of a tape drive having features of the present invention, and a tape cartridge that has been inserted into the tape drive, which can be included as part of the tape library system illustrated in FIG. 2.

FIG. 3 is a simplified schematic top view illustration of a magnetic tape drive 326, and a magnetic tape cartridge 320 that has been inserted into the tape drive 326, which can be included as part of the tape library system 210 illustrated in FIG. 2. In FIG. 3, covers for the tape drive 326 and the tape cartridge 320 have been omitted for clarity so that the interior of such components is visible. It is appreciated that the tape drive 326 as shown in FIG. 3 represents a generic tape drive, and is shown by way of example and not by way of limitation. In some embodiments, the tape drive 326 operates in compliance with an LTO specification, such as LTO-8 or LTO-9. Stated in another manner, in such embodiments, the tape cartridge 320 is an LTO-compatible tape cartridge.

During use of the tape drive 326, the tape cartridge 320 is inserted into a drive housing 340 of the tape drive 326 so that the tape drive 326 can read data from and/or write data to the tape cartridge 320. As shown, the tape cartridge 320 includes a cartridge reel 346 that includes and/or defines a cartridge hub 348. A magnetic tape 350 is spooled about the cartridge hub 348 of the cartridge reel 346. In certain embodiments, the magnetic tape 350 can include at least one servo track (not shown) and a plurality of data tracks (not shown) that run along a longitudinal length of the magnetic tape 350. Each of these tracks can be positioned substantially parallel to each other.

In certain embodiments, the magnetic tape 350 can have multiple partitions (not shown in FIG. 3) that are separated and/or isolated from one another such that changes made to data in one partition of the magnetic tape 350 do not impact data included in any other partitions of the magnetic tape 350. It is appreciated that the partitions on the magnetic tape 350 can be defined in any suitable manner, such as longitudinally along a length of the magnetic tape 350 and/or laterally across a width of the magnetic tape 350. It is further appreciated that the different partitions of the magnetic tape 350 can be utilized for purposes of replicating or copying the data when it has been determined that more ideal dimensional stability conditions and/or environmental conditions are being experienced in contrast to the dimensional stability conditions and/or environmental conditions that existed at the time the data tracks were previously written.

The tape cartridge 320 supplies the magnetic tape 350 to the tape drive 326. More particularly, when the tape cartridge 320 is inserted into the tape drive 326, one end of the magnetic tape 350 is taken up within the tape drive 326 to be wrapped around a drive reel 352 included in the tape drive 326. The magnetic tape 350 traverses a predefined path 351 between the cartridge reel 346 and the drive reel 352, which is defined, a least in part, by one or more rollers 354 (two are shown in FIG. 3) positioned at strategic positions along the predefined path 351. The rollers 354 may also aid in limiting gross lateral movement (i.e. in and out of the page as shown in FIG. 3) of the magnetic tape 350, i.e. lateral tape motion or "LTM".

Along the predefined path 351, the drive reel 352 moves the magnetic tape 350 across a tape head assembly 356 (also sometimes referred to simply as "tape heads") that is configured to read data from and/or write data to the magnetic tape 350. In alternative embodiments, the head assembly 356 can include at least one read head, at least one write head, and at least one read/write head. In particular, the head assembly 356 is positioned in close proximity to the predefined path 351 of the magnetic tape 350 such that as the magnetic tape 350 travels in the longitudinal direction (by being wound from the cartridge reel 346 to the drive reel 352 or vice versa) the head assembly 356 can read/write data to particular tracks and longitudinal positions of the magnetic tape 350. In various embodiments, the head assembly 356 and/or a separate head assembly can include one or more servo elements configured to read the servo track(s) of the magnetic tape 350 in order to effectively maintain proper alignment between the head assembly 356 and the magnetic tape 350. It is appreciated that the tape drive 326 can include any suitable number of tape heads within the head assembly 356 for purposes of reading data from and/or writing data to the magnetic tape 350. For example, in one non-exclusive embodiment, the head assembly 356 can include 32 tape heads for purposes of reading data from and/or writing data to the magnetic tape 350.

In some embodiments, as shown, the tape drive 326 can also include a cartridge reel motor 358 (illustrated as a box in phantom) that generates the necessary force to rotate the cartridge reel 346 at will, and a cartridge reel encoder 360 (illustrated as a box), such as a sensor or detector, that is configured to output signals representing the pulse rate (or rotation rate) of the cartridge reel motor 358. In certain embodiments, the tape drive 326 can further include a drive reel motor 362 (illustrated as a box in phantom) that generates the necessary force to rotate the drive reel 352 at will, and a drive reel encoder 364 (illustrated as a box), such as a sensor or detector, that is configured to output signals representing the pulse rate (or rotation rate) of the drive reel motor 362.

As illustrated in this embodiment, the tape drive 326 also includes an actuator 366 and a drive controller 368 that can be communicatively coupled to the head assembly 356. The actuator 366 is configured to control the lateral position of the head assembly 356 and/or the individual tape heads of the head assembly 356 relative to the magnetic tape 350 based on a signal provided by the drive controller 368. As such, the actuator 366 comprises a mechanical positioner to move the head assembly 356 up or down laterally. By controlling the lateral position of the head assembly 356 relative to the magnetic tape 350, particular tracks of the magnetic tape 350 can be accessed as desired. Alternatively, the tape drive 326 can include more than one actuator 366. For example, the tape drive 326 can include a separate actuator 366 for each head.

The drive controller 368 is in communication with the actuator 366 and a number of other components within the tape drive 326. For example, although not specifically shown in FIG. 3, each of the cartridge reel motor 358, the cartridge reel encoder 360, the drive reel motor 362, and the drive reel encoder 364 can be in communication with the drive controller 368. As such, the drive controller 368 can be configured to perform various specified operations, either individually, or in combination with other software, hardware and/or firmware elements.

More particularly, in some embodiments, the drive controller 368, via drive firmware, drive hardware and/or drive software that is incorporated within the drive controller 368, can function as the condition monitor that is used to monitor dimensional stability conditions and/or environmental conditions for the tape drive 326 and the tape cartridge 320, such as humidity, temperature, aging and creep. In situations when data is written to data tracks on the magnetic tape 350 in environmental conditions that are less than ideal, the drive controller 368 can continually monitor the environmental conditions to determine when and if the current environmental conditions have moved at least a certain threshold value toward more ideal environmental conditions (such as more moderate humidity (such as 40% to 50% RH) and temperature). When such determinations are made, then the tape drive 326 and/or the data replicator is configured to replicate or copy the data onto a different partition of the same magnetic tape 350 or onto a different magnetic tape 350. In such more ideal environmental conditions, the tape drive 326 is then better able to read the written data under the different, improved current environmental conditions. Moreover, with the data now having been written in such more ideal environmental conditions, the tape drive 326 is better able to accurately read such data even in situations where the environmental conditions have again strayed from the ideal. Subsequently, the previously written data tracks that were written in less ideal environmental conditions can be deleted, thereby recovering its location on the magnetic tape 350 for new data.

In certain embodiments, as shown, the tape cartridge 320 can include a cartridge memory 370 (illustrated as a box) that is usable to store information related to use of the tape cartridge 320 and the magnetic tape 350 retained therein. For example, in some embodiments, the cartridge memory 370 can be used to store information as metadata regarding environmental conditions under which data has been written to the magnetic tape 350. In certain embodiments, the cartridge memory 370 can store information regarding an age of the magnetic tape 350 so that data on the magnetic tape 350 can be replicated and/or copied to another magnetic tape when the magnetic tape 350 reaches an age where the quality of the magnetic tape 350 and/or the data written thereon starts to deteriorate.

As noted above, current LTO-9 tape technology requires narrower tracks to increase areal densities, while using the same tape substrates with similar TDS characteristics as previous generations where wider tracks were used. As such, the LTO-9 tapes have lesser ability to allow for changes in dimensional stability and/or environmental conditions while still being able to accurately read the data that has been written to the tape under such changed conditions. For example, the effective operational environmental range which has historically been 20% to 80% relative humidity (RH) has been narrowed for LTO-9 tapes down to 20% to less than 50% RH. This new requirement can have a negative impact on how the tapes are used in low and mid-size markets where tighter environmental controls may not be an option.

Thus, with the present invention, a partitioned tape-based TDS compensation system and method is provided where partitions are used to replicate data temporarily while managing access capacity adaptively therefore enabling the system to operate over typical wide environmental ranges with reliability of narrower and higher cost archival range. As described, such system and method is usable to compensate for tape lateral dimension changes as a result of humidity, as well as those resulting from other conditions such as temperature and aging and creep.

Figure 4:
FIG. 4 is a chart showing a typical map of user data error rates classified as High, Low and Error as a function of humidity conditions under which the data was initially written and then subsequently read.

FIG. 4 is a chart 400 showing a typical map of user data error and/or reliability rates classified as High, Low and Error as a function of humidity conditions under which the data was initially written and then subsequently read. In such chart 400, "HI" is used to indicate a high probability that the data can be read accurately under such conditions, "LO" is used to indicate a low probability that the data can be read accurately under such conditions, and "ERR" is used to indicate that an error will result (the data will not be read accurately) when reading the data under such conditions. For example, as shown, data tracks written with a relative humidity of 20% RH will experience errors when read at conditions of 70% or 80% RH, and may experience errors when read at conditions of 60% RH. Somewhat similarly, data tracks written with a relative humidity of 80% RH will experience errors when read at conditions of 20% or 30% RH, and may experience errors when read at conditions of 40% RH. As illustrated in FIG. 4, the closer one gets to writing the data tracks at conditions of 50% RH, the greater the ability to accurately read the data tracks at environmental conditions ranging from 20% RH to 80% RH. Thus, it is generally desired that data tracks ultimately be written at or near 50% RH, with some minor variation down to approximately 40% RH or up to approximately 60% RH, because that will enable the data tracks to be accurately read at a wide range of environmental conditions from approximately 20% RH to approximately 80% RH.

In various embodiments, the tape library system, including the condition monitor, such as via the host software 202C (illustrated in FIG. 2) and/or the drive controller 368 (illustrated in FIG. 3), is able to monitor dimensional stability conditions and/or environmental conditions by analyzing the lateral dimensions of the magnetic tape 350 (illustrated in FIG. 3) which can be measured by a distance between two or more servo tracks on the magnetic tape 350 or by reading a condition of a pre-calibrated cartridge where data is written at known environmental conditions. The tape library system can then use combinations of this information as metadata to update cartridge memory (CM) 370 (illustrated in FIG. 3) or other locations storing the metadata, such as on the magnetic tape 350 itself, related to the conditions of the tracks when written.

During use, the tape library system, including the condition monitor, such as via the host software 202C and/or the drive controller 368, will continue to monitor the dimensional stability conditions and/or environmental conditions as the system operates. When the system detects conditions such that previously written data is reaching its limit of operatable range, where error rates are ideal and C2 will not fail, the host software 202C and/or drive controller 368 will request the system to generate a new copy of this data section. Stated in another manner, when the system detects that the dimensional stability conditions and/or environmental conditions have changed by at least a certain threshold value (such as at least approximately 5% RH, 10% RH, 15% RH, 20% RH, 25% RH or 30% RH) toward a preferred operating range, e.g., the humidity has moved by at least the threshold value toward 50% RH (or 40% to 50% RH), the data replicator, such as the host software 202C and/or the drive controller 368, will request that the data in such section be replicated and/or copied to a different partition on the magnetic tape 350 or to a new magnetic tape. As the data has now been written at such new conditions, it is appreciated that the data can now be accurately read at a broader/ expanded overall operating range of the system, such as would be indicated by the chart 400. Appropriate metadata will also then be recorded in the cartridge memory 370 and/or on the magnetic tape 350 itself that indicates the dimensional stability conditions and/or environmental conditions for this new writing of the data.

Thus, it is appreciated that by partitioning the magnetic tape 350, previous data sections on the magnetic tape 350 can easily be rewritten without affecting the other existing data, so each tape partition can be written with a replicated or encoded version of the data in question such that the system can read the data with high reliability even if the dimensional stability conditions and/or environmental conditions have changed. It is further appreciated that such replication of the data as conditions move toward a most preferred level, such as humidity conditions moving toward at or near 50% RH, can be accomplished in a single step or a combination of steps depending upon the predetermined threshold value for replication and the existing conditions when the data is initially or subsequently written. It is also noted that since certain environmental conditions are favorable, the full range such as data written at 50% RH may be read at both extremes, as the replicated data is written at the favorable range, the system will no longer need the original version. Therefore, the original or previous version(s) of the data written at less than preferred conditions can be deleted, thereby recovering its location on the tape 350 for new data.

As such, the described algorithm is the basis for the present invention since adaptively generating replicated or encoded data eventually requires only the single copy version written at preferred conditions without requiring overhead in capacity, while making the data accessible at all corners of the environmental conditions. This constitutes the adaptive control that is enabled by this system.

By way of a simple example, assume that the system is utilizing a 4-partition tape, where each partition is one of the four data bands of an LTO-9 tape. Also, assume that the initial data is written to tape partition #0 under environmental conditions of 80% RH and hot. Under such conditions, it is understood that the system will not be able to accurately read such data if the conditions change down to 20-30% RH or potentially even at 40% RH, per the table 400 illustrated in FIG. 4. The tape library system and/or the condition monitor will then monitor the environmental conditions, knowing that the data will reach its limit of accurate readability if the humidity is down to 50% RH. So, if conditions are detected that have moved by at least the certain threshold value, the system will then copy the data from tape partition #0 to another tape partition, such as tape partition #1, so that temporarily there will be two copies of the particular data, one on tape partition #0 and one on tape partition #1.

Now the copy written to tape partition #1 at the new environmental conditions, such as humidity of 50% RH, can be accurately read at 80% RH as well as down to 20% RH per the table 400 illustrated in FIG. 4. Therefore, once the copy is complete, the original data written to tape partition #0 at 80% RH can be deleted such that its space can be used for new data.

As the system continues operating in this manner, all data written over the 20% to 80% RH range will be adaptively rewritten over the tighter range which is 40% to 50% RH per the table 400 illustrated in FIG. 4, which results in an ideal archival data with system operating in wide environmental range. This results in low-cost operations as well as highly reliable data based on ideal TDS margins even when using substrates that are very sensitive to environmental conditions.

Thus, a key feature of the present invention is the ability to not only solve the TDS problem for a wide environmental range, but also that the data written is adaptively moved to the ideal conditions where temporary replication is used as the process so that no overhead costs are realized.

In another simple example, the general process is the same as described above, but tape partition #0 is part of a first magnetic tape (and can encompass the entire first magnetic tape), and tape partition #1 is part of a second magnetic tape.

It is further appreciated that the system and method of the present invention can also be implemented by the tape drive 326 (illustrated in FIG. 3) itself since tape drives come with internal data RAM buffer. So, with a tape cartridge 320 (illustrated in FIG. 3) loaded, the tape drive 326 can check to see if any partitions were written at extreme conditions. If the humidity and tape dimensions indicate the conditions have changed, the tape drive 326 can read the data from one partition written in extreme conditions and copy it to another partition using the internal buffer space, therefore no host is involved in data copying, but data is copied by the tape drive 326 itself. In this case, the metadata on the tape 350 and CM 370 needs to be updated to indicate that the original data is at a different wraps or partitions.

Figure 5:
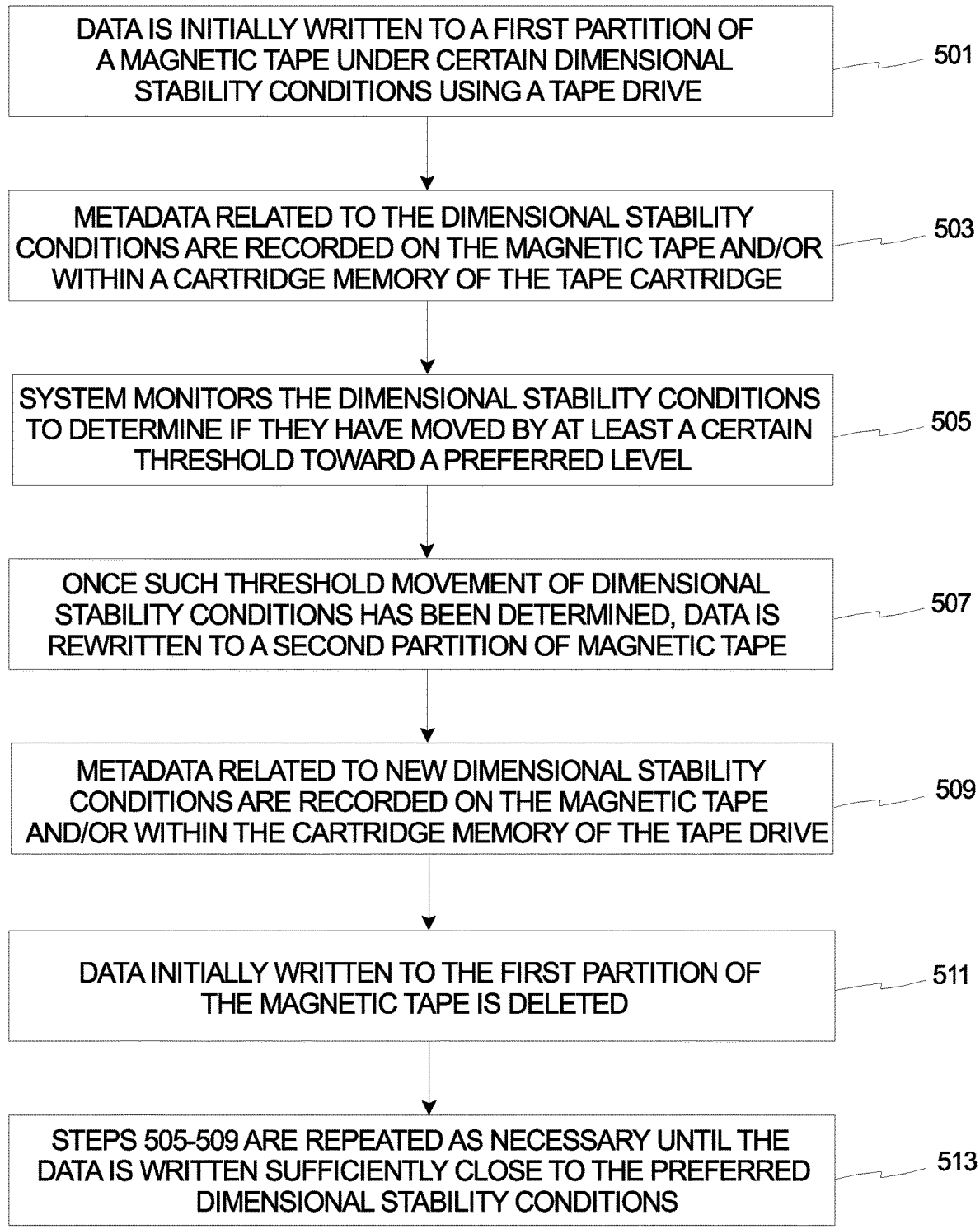
FIG. 5 is a simplified flowchart illustrating one representative methodological algorithm for use of a tape library system having features of the present invention to enable more accurate reading of data from a tape cartridge in varying dimensional stability conditions.

FIG. 5 is a simplified flowchart illustrating one representative methodological algorithm for use of a tape library system having features of the present invention to enable more accurate reading of data from a tape cartridge in varying dimensional stability conditions.

At step 501, data is written to a first partition of a magnetic tape that is retained within a tape cartridge under certain dimensional stability conditions using a tape drive.

At step 503, metadata related to the dimensional stability conditions under which the data has been initially written to the first tape partition of the magnetic tape are recorded on the magnetic tape, and/or within a cartridge memory of the tape cartridge. It is appreciated that if the metadata is recorded on the magnetic tape, the metadata can be also written to the first tape partition (same as the data itself) or the metadata can be written to a separate tape partition of the magnetic tape.

At step 505, the tape library system, using a condition monitor such as via host software and/or a drive controller of the tape drive, monitors the dimensional stability conditions under which the tape drive is operating. The tape library system and/or the condition monitor further monitors such dimensional stability conditions to determine if the dimensional stability conditions have moved by at least a certain threshold value toward a preferred level for the dimensional stability conditions. For example, when the monitored dimensional stability conditions include the ambient humidity conditions, the tape library system and/or the condition monitor can monitor the ambient humidity conditions to determine if the ambient humidity conditions have moved by at least a certain threshold value toward a preferred level of humidity, such as approximately 50% RH.

At step 507, once the tape library system has determined that the dimensional stability conditions have moved by at least the certain threshold value toward the preferred level for the dimensional stability conditions, the tape library system and/or the data replicator, such as via the host software and/or the drive controller of the tape drive, can initiate a replication or rewriting of the data to a second tape partition of the magnetic tape that is different than the first tape partition. In one such embodiment, the first tape partition and the second tape partition are part of the same magnetic tape. In another such embodiment, the first tape partition and the second tape partition can be included in different magnetic tapes.

At step 509, metadata related to the dimensional stability conditions under which the data has been subsequently rewritten to the second tape partition of the magnetic tape are recorded on the magnetic tape, and/or within the cartridge memory of the tape cartridge.

At step 511, the data that was initially written to the first tape partition of the magnetic tape is deleted such that such space can again be used for new data.

At step 513, steps 505-509 are repeated as necessary until the data is finally written sufficiently close to the preferred level for the dimensional stability conditions that the data can be accurately read from the magnetic tape regardless of the then-existing dimensional stability conditions.

As described, in various embodiments, monitoring the humidity and/or temperature over time will use an adaptive control algorithm using in loop hysteresis to filter out transient events so data movement rate is minimized while making sure all data eventually gets written at an ideal range of 40% to 50% RH. This further recognizes that 40% to 50% RH is the true archival range for TDS even though the system operates over a wide range of environment.

In some embodiments, the algorithm can incorporate ideas and concepts regarding how to sense when it is most appropriate to move the data. In particular, each LTO generation drive has its TDS margins based on media characteristics which are dictated by the tape substrate specifications. The tape media has a prerecorded servo format that can be measured by the tape drive to determine the time zero dimensions at a given condition. Subsequently, the same essential measurement can be used to detect any changes in dimensions that may result from any changed environmental conditions. Such data can be stored both in tape as a data and in the cartridge memory.

Also, system humidity and temperature sensors can be used to indicate when to move the data and use it as a part of the system metadata by storing the data in the cartridge memory and tape as magnetic data.

Another method is to use the actual track magnetic characteristics to help with the dimensional condition of the magnetic tape. These types of data are the tape drive's internal data such as per channel SNR, error rates and data path equalization responses. However, these types of data are typically not accessible by the host system.

Another method is to use a combination of environmental metadata and actual data cartridges where the combination can be used as part of a diagnostic tape with calibrated sections where data is written at known environmental conditions. For instance, the tape library system can use an isolated calibrated cartridge where data is written at various environmental conditions, which can be read to determine the condition of the other tapes.

In a typical application the use of servo format based dimensional feedback and the current conditions of the environment in terms of temperature and humidity is the best way to determine when and if the data needs to be moved by temporary replication.

Although humidity and temperature are sufficient to achieve similar results, especially if the system can use pre-calibrated, experimental-based data showing a time element as well as environmental conditions can also be used to determine data migration based on tapes from different vendors. In this case, experiments will be conducted using media from different vendors and measure the media dimensional change TDS as a function of temperature, humidity, and time at each condition where the experiment will result in calibrated table values instead of High, Low and Err as shown in FIG. 4, but with actual error rate values.

Besides environmental conditions such as humidity or temperature resulting in dimensional changes to the magnetic tape, there are also other conditions that critical with TDS. For example, one of the other challenges with TDS is called aging, which can result in an irreversible change in the lateral dimensions of the tape substrate of the magnetic tape. Unlike humidity, aging is not reversible and currently there is no clear solution other than reserving margins which becomes very difficult as track density increases. This proposed concept also can be used to compensate for aging. The overall concept is similar, but instead of monitoring humidity and temperature, the tape library system and/or the condition monitor now monitors tape dimensional change using special servo format information such as the case in LTO using the drive's magnetic servo heads or other means. Subsequently, when a change is observed confirming the aging media, the software can use the temporary replication as means to compensate against aging. Metadata will be used to indicate if the data in a partition is already aged or not.

Figure 6:
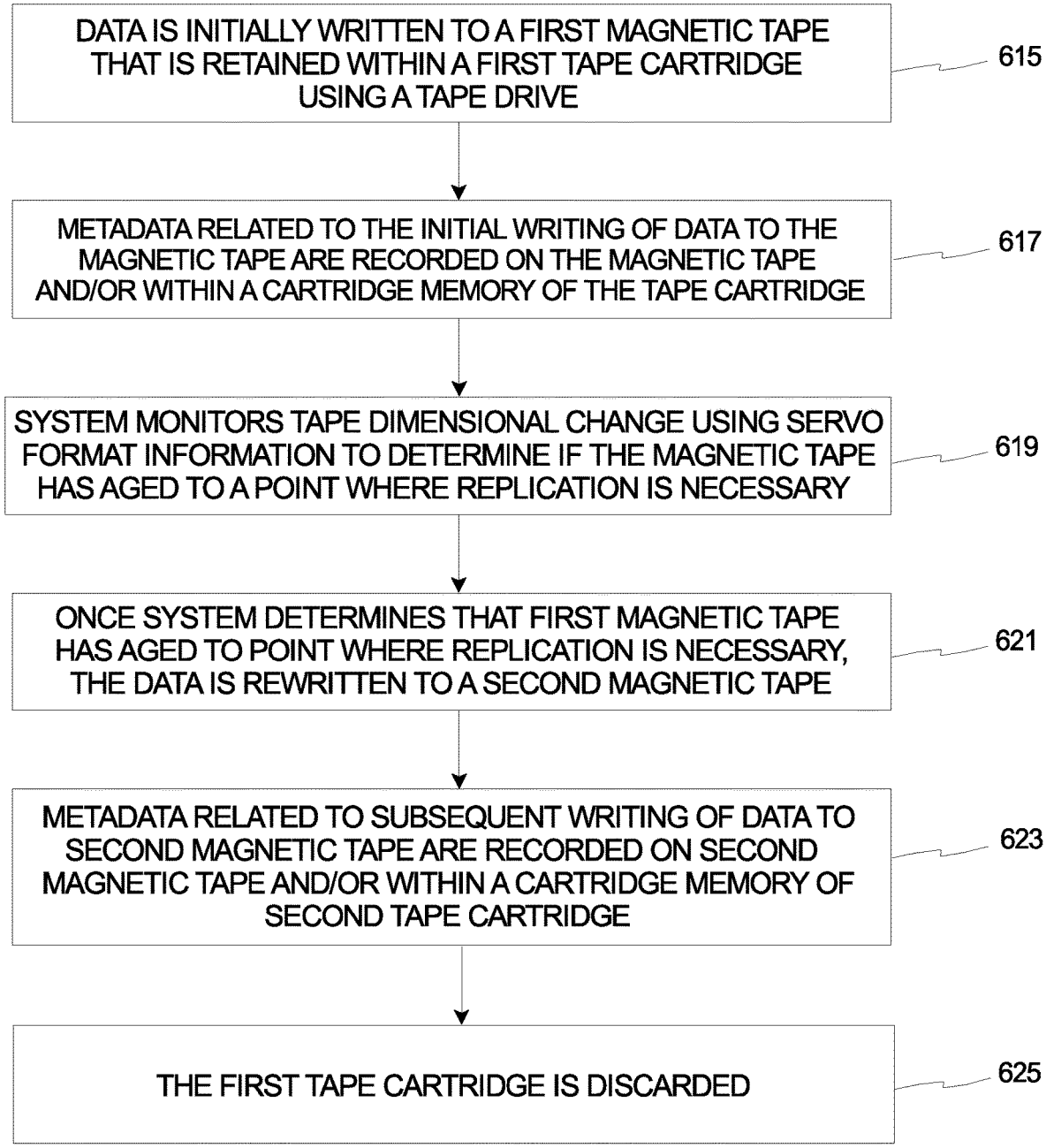
FIG. 6 is a simplified flowchart illustrating another representative methodological algorithm for use of a tape library system having features of the present invention to enable more accurate reading of data from a tape cartridge in varying dimensional stability conditions.

FIG. 6 is a simplified flowchart illustrating another representative methodological algorithm for use of a tape library system having features of the present invention to enable more accurate reading of data from a tape cartridge in varying dimensional stability conditions. In particular, FIG. 6 illustrates a methodological algorithm for addressing aging of the magnetic tape.

At step 615, data is written to a first magnetic tape that is retained within a first tape cartridge using a tape drive.

At step 617, metadata related to the initial writing of the data to the magnetic tape is recorded on the first magnetic tape, and/or within a cartridge memory of the first tape cartridge.

At step 619, the tape library system and/or the condition monitor monitors tape dimensional change using special servo format information such as the case in LTO using the drive's magnetic servo heads or other means to determine if the magnetic tape is aged to a point where data replication is necessary and/or appropriate to inhibit errors during reading of the data due to such tape dimensional changes.

At step 621, once the tape library system has determined that the magnetic tape has aged to the point where data replication is necessary and/or appropriate, the tape library system and/or the data replicator can initiate a replication or rewriting of the data to a second magnetic tape, retained within a second tape cartridge, that is different than the first magnetic tape.

At step 623, metadata related to the subsequent rewriting of the data to the second magnetic tape is recorded on the second magnetic tape, and/or within a cartridge memory of the second tape cartridge.

At step 625, because the first magnetic tape and/or first tape cartridge has aged beyond a usable point, the first tape cartridge with the first magnetic tape retained therein can be discarded.

Another TDS problem that can be experienced is the problem of over-trimming, such as when data is written in one extreme corner, and later data is appended causing over-trimming at the other extreme such as shown in FIG. 1. Current LTO-9 tape drives monitor this case and prevent the tape drive from writing in such situations, which basically results in the system coming to a halt and becoming non-operational. However, with the present invention, since a partitioned tape is used where each partition is written in a specific range of environmental conditions and not mixed with data from a different environmental range, the software effectively inhibits over-trimming tracks. In such situations, the metadata is the key to identify which partition is written at which environmental conditions, and based on tape drive and format requirements, the software can determine if it is safe or not to write to a partition or whether data must be written to a different partition to inhibit over-trimming tracks, which could otherwise result in unrecoverable written data in hard error where recovery of data is not possible.

It is appreciated that in various implementations, the methodological algorithms as described herein effectively address the problem of archival life management with tapes operating over a wide environmental range. Environmental conditions impact TDS, which is the dimensional stability of written data tracks as the system reads pre-written data at another condition as a function of temperature, humidity, aging and creep, plus the life of media if it is exposed to extreme conditions for prolonged durations. The proposed algorithms as described above address the TDS part of the problem, whereas the overall life is still an issue unless the media is always kept and operated within a narrow 30-year archival range. Once the tapes are rewritten at ideal long-term archival conditions, such as is typically in the 40-50% RH range, the system will no longer need to move the data except due to long-term life data reliability degradation. In such situations, if detected, the software will again check for the ideal conditions to move the data to a new set of tapes. This will also provide long-term archival life with long-term TDS data reliability adaptively, while the overall system is operating in the wide non-archival range that is 20-80% RH. With the overall archival reliability of BaFe media, this concept solves the TDS and life issues related to operating tapes in a wide environmental range specifically with high track density operating point LTO such as LTO-8, LTO-9 and future generations.

In summary, it is appreciated that use of the present invention can provide various benefits and advantages for the user. For example, a user of the present invention can appreciate benefits and advantages such as:

1) Ability to operate LTO-9 and higher generation tape drives over the full environmental range of 20-80% RH, with optimum TDS requirements;

2) Ability to use low-cost high TDS substrates like PEN and PET instead of costly Aramid types;

3) Written data to be at optimum TDS specification where change in humidity is between 40% and 50% RH;

4) Ability to compensate for media aging related dimensional change that is irreversible;

5) No capacity overhead requirements;

6) Only cost is data movement adaptively using either tape drives internal resources or host software; and 7) Ability to adaptively manage media archival life with data written at ideal TDS conditions while the overall system operates in wider operational environmental range.

Certain features and aspects of the present invention can also be implemented through the use of caching tapes. For example, another feature in magnetic tape usage is the case where such tapes for long-term archival, especially the latest generations of LTO such as LTO-9 that use thinner substrates to increase capacities, require data written in full stream where the stop and starts, back hitches, and underruns can all result in stagger wraps and tension variations in packed media which can impact the tape's useful life and data durability. Therefore, when writing data at any environmental condition as the tape drive receives user data is best done by controlling writing such that the stops/starts are limited at the ends of the tape where it is typically a physical requirement; this will ensure no unwanted stagger wraps and tension variations. However, it is appreciated that there is no proper scheduling when data will arrive with what size and what the environmental conditions will be at the time of arrival. Therefore, a typical tape system either uses large disk caches with complex and costly durability management such as RAID systems, or treats tape as a start/stop device which can cause the reliability issues as discussed herein.

Thus, in some embodiments, the concept involves using a tape as a cache storage where it is written as data arrives. When the system is idle and at least two wraps of data are written, the data is migrated to the final tape with the selected environmental zone as described above in a full stream mode such that writing will start at BOT and end at BOT with the tape having no interruptions during write. Data is also written using an ideal speed, which may not be maximum write speed, but some intermediate tape speed where tracking is best due to lower speeds and stop write related problems are minimized which is key for high track density LTO.

Eventually after several uses the cache tape will be retired and replaced with another tape. The data error rate and tracking metrics collected from the tape drive for either tape can be used to determine when to retire the cache tapes based on an adaptive algorithm such as machine learning.

This method is also ideal for the environmentally managed TDS management tape management algorithm as described above since a cache tape is a place to collect user data that can be also used to determine which final tapes to move the data to based on its environmental conditions. The use of tape cache in such manner can be a low-cost and ideal means to manage TDS. However, data movements as well as minimizing tape motion interruptions during write to maximize data life and data durability due to physics of smoot thin media moving at very high speeds and wrapping to and from rotating reels causing long sections of air entrainment in reels, which is a source of stagger wraps when suddenly stopped for a back hitch or underrun, must also be considered.

Another benefit of cache tapes is the improvement of tape life with LTFS applications due to the limited passes at BOT region of any LTFS tape due to format update-based rewinds and back and forth motions about the BOT region. It is a known problem with POTFS format and tape usage especially with random user data size and random arrival times which collectively result in tape wear especially about the BOT region due to LTFS format requirements. Since the tape drive does not know when and how big the data will arrive especially with LTFS formatted tapes, the life of media is a known and well discussed topic limiting the use of LTFS. Thus, this caching tape concept is a simple and low-cost means of solving this problem without requiring expensive Erasure coded Object Store or RAID based HDD or SSD systems.

Erasure coding or replication can also be used as a local means of protection with cache tapes. Erasure coding requires data to be collected at some minimum size and stored reliably in a local cache memory so it can be processed mathematically to generate the encoded data finally to be written to tapes. The minimum size data chunks collection of various user data with various sizes and protected non-volatile memory is the challenge for low-cost but reliable and high-performance systems. The use of tape as cache is a unique method to implement to eventual erasure coded tapes with either multi-tape EC or two-dimensional EC concepts.

The problem can be split into two phases, where phase one is writing user data to cache tapes, and phase two is moving data from cache tapes to final erasure-coded tapes.

Phase one is the writing of user records to one or more cache tapes as they arrive regardless of their size and arrival times. It is noted that user records are protected by tape format, but for true protection due to other non-random tape errors such as cut tape, hard write errors, and/or drive mechanism problems, the caching system may use two cache tapes simultaneously, with one as the copy. The importance of cache tapes is to keep data protected on tape until they are moved to final tapes with or without erasure coding. Several techniques can be employed to provide additional protection for user records while they are on cache tape(s) such as (i) using copy with other cache tapes where same records are written to two or more cache tapes; and (ii) writing replicated records on the same tape either consecutively or interleaving with other records.

Also, rateless codes can be used where one can use very fast XOR-based math to encode data but treating each record or user file as an independently erasure coded file. For example, a single 2 MB file or 1 GB file each can be erasure coded with rateless encoding technique treating the entire file as one entity and adding parities to the file making the encoding process doable, fast and efficient without requiring large memory.

During phase two, since user data is already on a cache tape and the system needs to move it to a selected tape based on environmental conditions, certain key processes need to be undertaken. These key processes include:

1) Identifying the target final set of tapes to which to move the data based on the environmental conditions the user records are written at to the cache tape, and selecting the final set of tapes accordingly;

2) Subsequently reading the files from cache tape(s) to final selected tapes by reading records to memory, building data chunks with equal sizes, erasure coding them, interleaving them and then writing these erasure coded chunks to a set of tapes or single tape forming either Erasure Coded Single Tape (Per Tape EC) or Multiple erasure coded tapes with parity tapes or combination that is two-dimensional EC all with same environmental zones; and 3) Once data is fully written, reclaiming the space on cache tape(s) for original data.

It is understood that although a number of different embodiments of the tape library system and/or tape drive have been illustrated and described herein, one or more features of any one embodiment can be combined with one or more features of one or more of the other embodiments, provided that such combination satisfies the intent of the present invention.

While a number of exemplary aspects and embodiments of the tape library system and/or tape drive have been discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A method for providing enhanced readability of data written to a magnetic tape, the method comprising the steps of:
   writing data to a first tape partition using a tape drive, the data being written under a first dimensional stability condition;
   monitoring an ambient dimensional stability condition with a condition monitor to determine if the ambient dimensional stability condition has moved at least a predetermined threshold value from the first dimensional stability condition toward a preferred dimensional stability condition; and
   replicating the data to a second tape partition with a data replicator when it has been determined that the ambient dimensional stability condition has moved at least the predetermined threshold value from the first dimensional stability condition toward the preferred dimensional stability condition.

2. The method of claim 1 wherein the predetermined threshold value entails movement of at least approximately 50% toward the preferred dimensional stability condition.

3. The method of claim 1 wherein the predetermined threshold value is determined at least in part based on one or more of track densities for a given capacity format, substrate specification, and transverse dimensional stability of the magnetic tape.

4. The method of claim 1 wherein the first dimensional stability condition includes relative humidity; and wherein the preferred dimensional stability condition is between approximately 40% and 50% relative humidity.

5. The method of claim 4 wherein the predetermined threshold value entails movement of at least approximately 15% relative humidity toward the preferred dimensional stability condition.

6. The method of claim 1 wherein the first dimensional stability condition includes one of temperature, aging, and creep.

7. The method of claim 1 wherein the first dimensional stability condition includes a physical tape dimension of the magnetic tape; and wherein the step of monitoring includes monitoring the physical tape dimension by measuring tape servo format information.

8. The method of claim 1 further comprising the step of deleting the data written to the first tape partition after the data has been replicated to the second tape partition.

9. The method of claim 1 wherein the first tape partition and the second tape partition are separate partitions of a common magnetic tape.

10. The method of claim 1 wherein the first tape partition is provided within a first magnetic tape; and wherein the second tape partition is provided within a second magnetic tape that is different than the first magnetic tape.

11. The method of claim 1 wherein the step of monitoring includes monitoring the ambient dimensional stability condition with one of a host application that is configured to provide instructions to the tape drive, and a drive controller of the tape drive.

12. The method of claim 1 wherein the magnetic tape includes a tape substrate including one of polyethylene naphthalate and polyethylene terephthalate.

13. The method of claim 1 further comprising one of (i) recording metadata related to the first dimensional stability condition on the magnetic tape; and (ii) recording metadata related to the first dimensional stability condition onto a cartridge memory of a tape cartridge that retains the first tape partition.

14. A system for providing enhanced readability of data written to a magnetic tape, the system comprising:
   a tape drive;
   a first tape partition, wherein data is written to the first tape partition using the tape drive, the data being written to the first tape partition under a first dimensional stability condition;
   a second tape partition;
   a condition monitor that monitors an ambient dimensional stability condition to determine if the ambient dimensional stability condition has moved at least a predetermined threshold value from the first dimensional stability condition toward a preferred dimensional stability condition; and
   a data replicator that replicates the data to the second tape partition when it has been determined that the ambient dimensional stability condition has moved at least the predetermined threshold value from the first dimensional stability condition toward the preferred dimensional stability condition.

15. The system of claim 14 wherein the predetermined threshold value entails movement of at least approximately 50% toward the preferred dimensional stability condition.

16. The system of claim 14 wherein the condition monitor includes a host application that is configured to provide instructions to the tape drive, the host application being configured to monitor the ambient dimensional stability condition to determine if the ambient dimensional stability condition has moved at least the predetermined threshold value from the first dimensional stability condition toward the preferred dimensional stability condition.

17. The system of claim 16 wherein the host application is further configured to replicate the data to the second tape partition when it has been determined that the ambient dimensional stability condition has moved at least the predetermined threshold value from the first dimensional stability condition toward the preferred dimensional stability condition.

18. The system of claim 14 wherein the condition monitor includes a drive controller of the tape drive, the drive controller being configured to monitor the ambient dimensional stability condition to determine if the ambient dimensional stability condition has moved at least the predetermined threshold value from the first dimensional stability condition toward the preferred dimensional stability condition.

19. The system of claim 18 wherein the drive controller is further configured to replicate the data to the second tape partition when it has been determined that the ambient dimensional stability condition has moved at least the predetermined threshold value from the first dimensional stability condition toward the preferred dimensional stability condition.

20. A method for providing enhanced readability of data written to a magnetic tape, the magnetic tape including a tape substrate including one of polyethylene naphthalate and polyethylene terephthalate, the method comprising the steps of:

writing data to a first tape partition using a tape drive, the data being written under a first dimensional stability condition;
  monitoring an ambient dimensional stability condition with a condition monitor to determine if the ambient dimensional stability condition has moved at least a predetermined threshold value from the first dimensional stability condition toward a preferred dimensional stability condition, the predetermined threshold value entailing movement of at least approximately 50% toward the preferred dimensional stability condition, monitoring including monitoring the ambient dimensional stability condition with one of a host application that is configured to provide instructions to the tape drive, and a drive controller of the tape drive;
  replicating the data to a second tape partition with a data replicator when it has been determined that the ambient dimensional stability condition has moved at least the predetermined threshold value from the first dimensional stability condition toward the preferred dimensional stability condition; and
  deleting the data written to the first tape partition after the data has been replicated to the second tape partition;
  wherein the first dimensional stability condition includes one of relative humidity, temperature, aging, creep, and a physical tape dimension of the magnetic tape; and
  wherein the predetermined threshold value is determined at least in part based on one or more of track densities for a given capacity format, substrate specification, and transverse dimensional stability of the magnetic tape.

* * * * *